United States Patent
Maes

(10) Patent No.: US 8,775,641 B2
(45) Date of Patent: Jul. 8, 2014

(54) SELF INVITATION TO INITIATE SESSIONS, START PROCESSES, OR GENERATE OUTBOUND MESSAGES

(75) Inventor: Stephane H. Maes, Fremont, CA (US)

(73) Assignee: Oracle International Corporation, Redwood Shores, CA (US)

(*) Notice: Subject to any disclaimer, the term of this patent is extended or adjusted under 35 U.S.C. 154(b) by 1509 days.

(21) Appl. No.: 11/669,327

(22) Filed: Jan. 31, 2007

(65) Prior Publication Data
US 2008/0181253 A1 Jul. 31, 2008

(51) Int. Cl.
*G06F 17/30* (2006.01)

(52) U.S. Cl.
USPC ........... 709/228; 709/220; 709/224; 709/230; 370/441

(58) Field of Classification Search
USPC ........ 370/466; 455/414.4, 417; 709/203, 223, 709/226, 227, 230
See application file for complete search history.

(56) References Cited

U.S. PATENT DOCUMENTS

| | | | | |
|---|---|---|---|---|
| 6,400,729 B1* | 6/2002 | Shimadoi et al. | ............. | 370/466 |
| 6,405,254 B1* | 6/2002 | Hadland | ........................ | 709/230 |
| 8,078,737 B2* | 12/2011 | Cosmadopoulos et al. | .. | 709/228 |
| 8,179,912 B2* | 5/2012 | Cosmadopoulos et al. | .. | 370/449 |
| 8,219,697 B2* | 7/2012 | Langen et al. | ................ | 709/230 |
| 2002/0187777 A1* | 12/2002 | Osterhout et al. | ............ | 455/417 |
| 2005/0044233 A1* | 2/2005 | Cai et al. | ........................ | 709/227 |
| 2005/0091362 A1* | 4/2005 | Shigeta et al. | ................ | 709/223 |
| 2005/0097367 A1* | 5/2005 | Nakazawa et al. | ............ | 713/201 |
| 2006/0277305 A1* | 12/2006 | Bernardin et al. | ............ | 709/226 |
| 2007/0121490 A1 | 5/2007 | Iwakawa et al. | | |
| 2008/0127232 A1* | 5/2008 | Langen et al. | ................ | 719/328 |
| 2008/0147524 A1* | 6/2008 | Connelly | ........................ | 705/30 |
| 2008/0167035 A1* | 7/2008 | Buckley et al. | ............ | 455/435.1 |

FOREIGN PATENT DOCUMENTS

EP 1519537 A2 * 3/2005

* cited by examiner

*Primary Examiner* — Khanh Dinh
(74) *Attorney, Agent, or Firm* — Kilpatrick Townsend & Stockton LLP

(57) ABSTRACT

Methods, systems, and machine-readable media are disclosed for initiating communications between entities operating in disparate environments and/or with different base protocols. According to one embodiment, a method for initiating a communication can comprise receiving a request from the first entity to initiate communications. An initiation message can be generated and formatted in a base protocol of the second entity. The base protocol of the second entity can be different from a base protocol of the first entity. The initiation message can be sent to the second entity to cause the second entity to initiate communications with a third entity in the base protocol of the second entity.

43 Claims, 7 Drawing Sheets

SELF INVITATION TO INITIATE SESSIONS, START PROCESSES, OR GENERATE OUTBOUND MESSAGES

BACKGROUND OF THE INVENTION

Embodiments of the present invention generally relate to the field of electronic communications. More specifically, embodiments of the present invention relate to communications between entities operating in disparate environments.

Various types of communications networks and devices operate in an ever increasing array of different environments and underlying or supporting protocols. For example, the ubiquitous HyperText Transfer Protocol (HTTP) is commonly used to support communications across various types of networks including the Internet. In another example, the Session Initiation Protocol (SIP) can be used by various types of end points/devices to support communications (e.g. VoIP, multimedia, presence information, instant messaging, etc) between such devices across various wired and/or wireless networks.

As different types of devices, protocols, environments, etc. proliferate, intercommunication between these environments becomes more and more important. However, current methods of initiating and supporting communications between these environments are difficult to use at best and in many cases, are simply not supported. Hence, there is a need in the art for improved methods and systems for initiating communications between entities operating in disparate environments.

BRIEF SUMMARY OF THE INVENTION

Methods, systems, and machine-readable media are disclosed for initiating communications between entities operating in disparate environments and/or with different base protocols. According to one embodiment, a method for initiating a communication can comprise receiving a request from a first entity to initiate communications. A message can be generated and formatted in a base protocol of a second entity. The base protocol of the second entity can be different from a base protocol of the first entity. For example, the base protocol of the first entity can comprise Session Initiation Protocol (SIP) and the base protocol of the second entity can comprise Hypertext Transfer Protocol (HTTP). Alternatively, the base protocol of the first entity can comprise HTTP and the base protocol of the second entity can comprise SIP. The message can be sent to the second entity to cause the second entity to perform an action such as to initiate communications with a third entity in the base protocol of the second entity. Alternatively, the message can be sent to the third entity to perform an action such as to initiate communications with the second entity in the base protocol of the second entity. According to one embodiment, the second entity and the third entity can be embodied on the same physical device.

According to one embodiment, the method can further comprise the third entity initiating a session supporting the base protocol of the second entity. Initiating the session supporting the base protocol of the second entity can be performed in response to the message. A session supporting the base protocol of the first entity can also be initiated by the third entity. Initiating the session supporting the base protocol of the first entity can be performed in response to receiving a request from the first entity to initiate communications with the second entity. State information can be shared between the session supporting the base protocol of the first entity and the session supporting the base protocol of the second entity. Sharing state information between the session supporting the base protocol of the first entity and the session supporting the base protocol of the second entity can be based on replication of one or more of the session supporting the base protocol of the first entity and the session supporting the base protocol of the second entity, on a Spring Framework (in the case of J2EE), on Jgroup (in the case of J2EE), on a shared data store, or in another manner. Additionally or alternatively, context information can be shared between the session supporting the base protocol of the first entity and the session supporting the base protocol of the second entity.

According to another embodiment, a system can comprise a communications network and a first entity communicatively coupled with the communications network and operating in a first environment. The system can also include a second entity communicatively coupled with the communications network and operating in a second environment. The second environment can be different from the first environment. An application server can be communicatively coupled with the communications network and adapted to receive a request from the first entity to initiate communications, generate a message formatted in a base protocol of the environment of the second entity, wherein the base protocol of the second entity is different from a base protocol of the environment of the first entity, and send the message to the second entity to perform an action such as to initiate communications between the first entity and the second entity in the base protocol of the second entity. For example, the base protocol of the first entity can comprise Session Initiation Protocol (SIP) and the base protocol of the second entity can comprise Hypertext Transfer Protocol (HTTP). Alternatively, the base protocol of the first entity can comprise HTTP and the base protocol of the second entity can comprise SIP. Additionally or alternatively, the message can be sent to a third entity to cause the third entity to perform an action such as to initiate communications with the second entity in the base protocol of the second entity.

According to one embodiment, the application server can be further adapted to initiate a servlet session supporting the base protocol of the second entity. Initiating the servlet session supporting the base protocol of the second entity can be performed in response to generating the message. The application server can be further adapted to initiate a servlet session supporting the base protocol of the first entity. Initiating the servlet session supporting the base protocol of the first entity can be performed in response to receiving the request from the first entity to initiate communications with the second entity. The servlet session supporting the base protocol of the first entity and the servlet session supporting the base protocol of the second entity can furthermore be adapted to share state information. Sharing of state information can be based on replication of one or more of the servlet session supporting the base protocol of the first entity and the servlet session supporting the base protocol of the second entity, on a Spring Framework, on a shared data store, or in another manner. Additionally or alternatively, context information can be shared between the session supporting the base protocol of the first entity and the session supporting the base protocol of the second entity.

According to yet another embodiment, a machine readable medium can have stored thereof a series of instructions which, when executed by a processor, cause the processor to initiate communications by receiving a request from the first entity to initiate communications with a second entity. A message can be generated and formatted in a base protocol of the second entity. The base protocol of the second entity can be different from a base protocol of the first entity. For example, the base protocol of the first entity can comprise Session Initiation Protocol (SIP) and the base protocol of the second entity can comprise Hypertext Transfer Protocol (HTTP). Alternatively, the base protocol of the first entity can comprise HTTP and the base protocol of the second entity can comprise SIP. The message can be sent to the second entity to cause the second entity to perform an action such as to cause the second entity to initiate communications with a third entity in the base protocol of the second entity. Alternatively, the initiation message can be sent to the third entity to cause the third entity to perform an action such as to initiate communications with the second entity in the base protocol of the second entity.

According to one embodiment, a session can be initiated with the third entity supporting the base protocol of the second entity. Initiating the session supporting the base protocol of the second entity can be performed in response to the message. A session supporting the base protocol of the first entity can also be initiated by the third entity. Initiating the session supporting the base protocol of the first entity can be performed in response to receiving a request from the first entity to initiate communications with the second entity. State information can be shared between the session supporting the base protocol of the first entity and the session supporting the base protocol of the second entity. Sharing state information between the session supporting the base protocol of the first entity and the session supporting the base protocol of the second entity can be based on replication of one or more of the session supporting the base protocol of the first entity and the session supporting the base protocol of the second entity, on a Spring Framework, on a shared data store, or in another manner. Additionally or alternatively, context information can be shared between the session supporting the base protocol of the first entity and the session supporting the base protocol of the second entity.

DETAILED DESCRIPTION OF THE INVENTION

Figure 1:
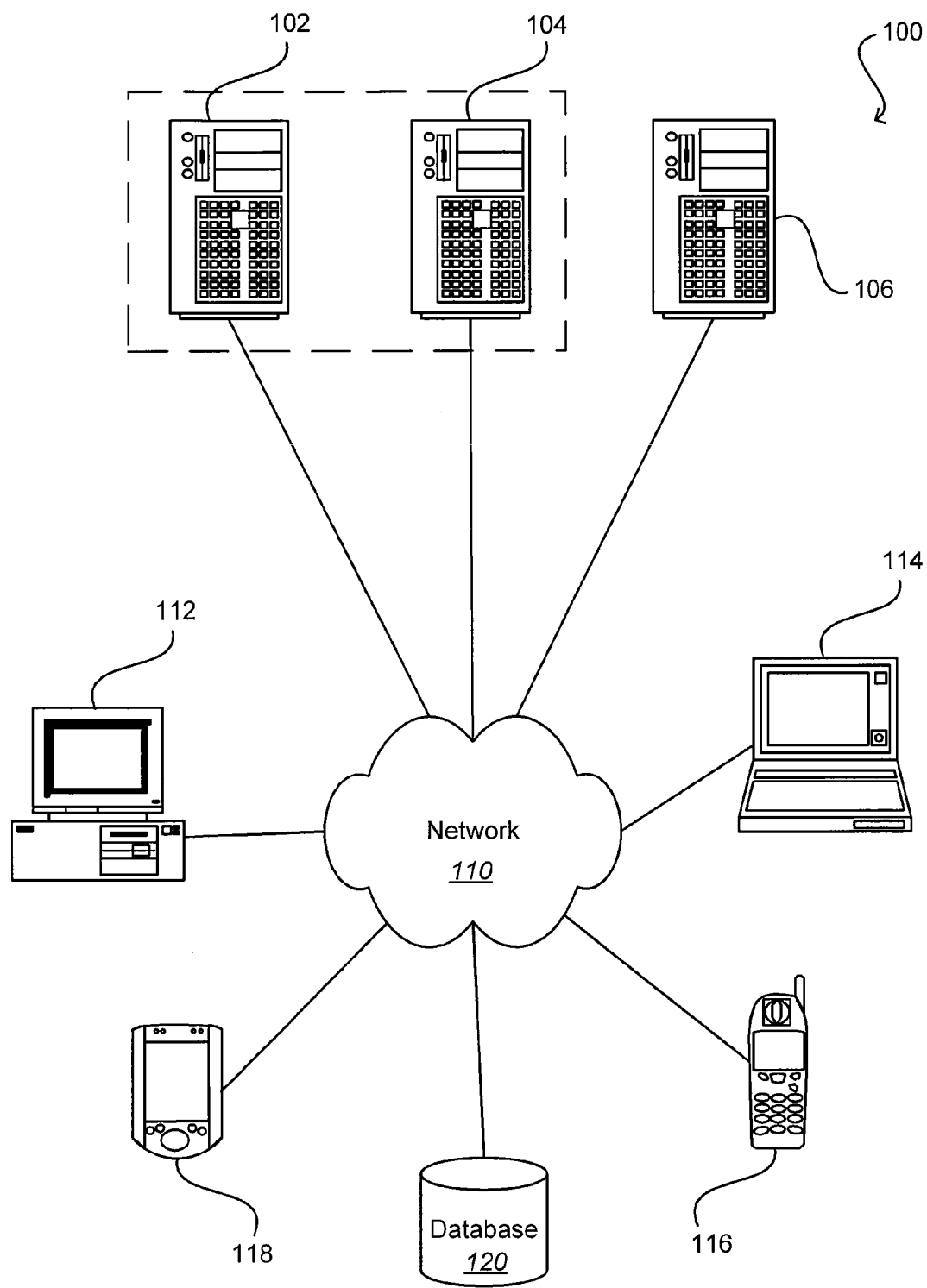
FIG. 1 is a block diagram illustrating an exemplary environment in which various embodiments of the present invention may be implemented.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

It should be noted that, while discussed herein with reference to SIP integration with Java through JSR 32 and JSR 116, embodiments of the present invention are not limited to such implementations. Rather, embodiments of the present invention can be applied to any system which can respond and/or initiate a session based on an incoming request or event but can't initiate such events, or mix multiple "modes" or environments that can't share their life cycle management (i.e., one environment can't start a session or application in another). While not limited to use with SIP, JSR 32, or JSR 116, these protocols demonstrate exemplary characteristics that may be useful in implementing various embodiments of the present invention.

Generally speaking, embodiments of the present invention relate to initiating and supporting communications between entities operating in disparate environments and/or with different base protocols. For example, as will be described in detail below, initiating a communication can comprise receiving a request from the first entity to initiate communications. The initiation message can be generated and formatted in a base protocol of the second entity. The base protocol of the second entity can be different from a base protocol of the first entity. For example, the base protocol of the first entity can comprise Session Initiation Protocol (SIP) and the base protocol of the second entity can comprise Hypertext Transfer Protocol (HTTP). Alternatively, the base protocol of the first entity can comprise HTTP and the base protocol of the second entity can comprise SIP. The initiation message can be sent to the second entity to cause the second entity to initiate communications with a third entity (as indicated by the message) in the base protocol of the second entity.

According to one embodiment, a session or servlet, e.g., an HTTP servlet or SIP servlet, can be initiated on an application server to support the base protocol of the second entity. Initiating the session supporting the base protocol of the second entity can be performed in response to the initiation message. It should be noted that, while referred to herein as an initiation message, the request to initiate communications need not take any particular form. That is, while in some embodiments the initiation message may be an initiation or INVITE message of the base protocol, such messages are not required. Rather, the initiation message can be any message that causes the recipient entity to react or perform some action. A session or servlet supporting the base protocol of the first entity can also be initiated on the application server. Initiating the session supporting the base protocol of the first entity can be performed in response to receiving a request from the first entity to initiate communications with a third entity.

So for example, an application can be initiated from a SIP client, namely by generating a SIP message to the application server. Then, inside the application server, the SIP servlet can be initiated and can create an HTTP request. For an example of this type of flow, see the "CallMeBack" type of application illustrated and discussed below with reference to FIG. 4. In another example, an application can be initiated from an HTTP client or browser. That is, inside the application server, the HTTP servlet can be initiated and can create the SIP request to a SIP client. For an example of this type of flow, see the "Click2Dial" type of application illustrated and discussed below with reference to FIG. 5.

FIG. 1 is a block diagram illustrating an exemplary environment in which various embodiments of the present invention may be implemented. The system 100 can include one or more user computers, computing devices, or processing devices 112, 114, 116, 118, which can be used to operate a client, such as a dedicated application, web browser, etc. The user computers 112, 114, 116, 118 can be general purpose personal computers (including, merely by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 112, 114, 116, 118 may also have any of a variety of applications, including one or more development systems, database client and/or server applications, and Web browser applications. Alternatively, the user computers 112, 114, 116, 118 may be any other electronic device, such as a thin-client computer, Internet-enabled gaming system, and/or personal messaging device, capable of communicating via a network (e.g., the network 110 described below) and/or displaying and navigating Web pages or other types of electronic documents. Although the exemplary system 100 is shown with four user computers, any number of user computers may be supported.

The system 100 can also include a communications network 110. The network may can be any type of network familiar to those skilled in the art that can support data communications using any of a variety of commercially-available protocols, including without limitation TCP/IP, SNA, IPX, AppleTalk, and the like. Merely by way of example, the network 110 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system may also include one or more server computers 102, 104, 106 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 106) may be dedicated to running applications, such as a business application, a Web server, application server, etc. Such servers may be used to process requests from user computers 112, 114, 116, 118. The applications can also include any number of applications for controlling access to resources of the servers 102, 104, 106.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 112, 114, 116, 118. As one example, a server may execute one or more Web applications. The Web application may be implemented as one or more scripts or programs written in any programming language, such as Java, C, C# or C++, and/or any scripting language, such as Perl, Python, or TCL, as well as combinations of any programming/scripting languages. The server(s) may also include database servers, including without limitation those commercially available from Oracle, Microsoft, Sybase, IBM and the like, which can process requests from database clients running on a user computer 112, 114, 116, 118.

The system 100 may also include one or more databases 120. The database(s) 120 may reside in a variety of locations. By way of example, a database 120 may reside on a storage medium local to (and/or resident in) one or more of the computers 102, 104, 106, 112, 114, 116, 118. Alternatively, it may be remote from any or all of the computers 102, 104, 106, 112, 114, 116, 118, and/or in communication (e.g., via the network 110) with one or more of these. In a particular set of embodiments, the database 120 may reside in a storage-area network ("SAN") familiar to those skilled in the art. Similarly, any necessary files for performing the functions attributed to the computers 102, 104, 106, 112, 114, 116, 118 may be stored locally on the respective computer and/or remotely, as appropriate. In one set of embodiments, the database 120 may be a relational database, such as Oracle 10g, that is adapted to store, update, and retrieve data in response to SQL-formatted commands.

Figure 2:
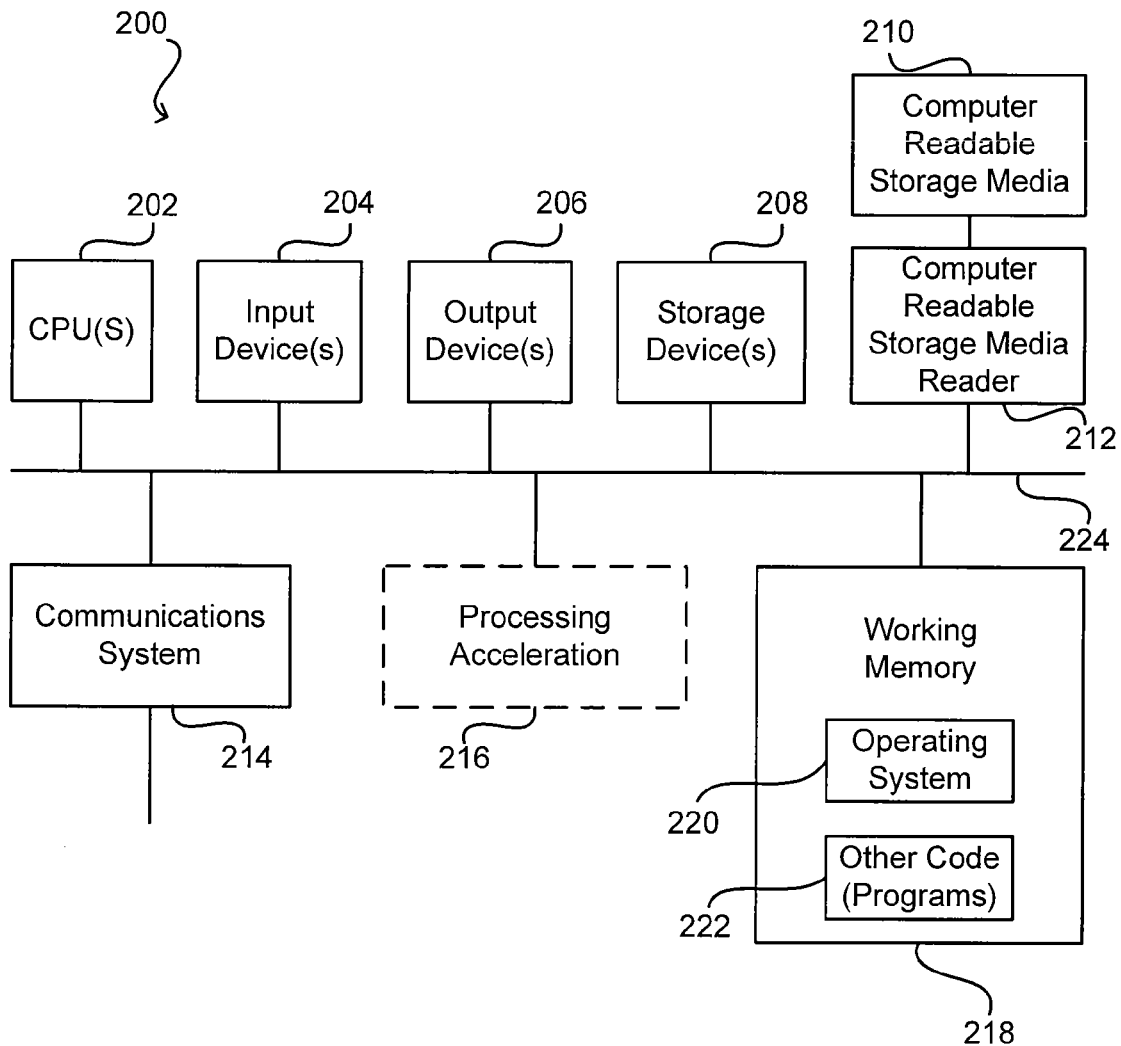
FIG. 2 is a block diagram illustrating an exemplary computer system upon which embodiments of the present invention may be implemented.

FIG. 2 is a block diagram illustrating an exemplary computer system upon which embodiments of the present invention may be implemented. The system 200 may be used to implement any of the computer systems described above. For example, one or more systems such as system 200 may be used to implement a server, user computer, and/or any other of the systems or components described above.

The computer system 200 is shown comprising hardware elements that may be electrically coupled via a bus 224. The hardware elements may include one or more central processing units (CPUs) 202, one or more input devices 204 (e.g., a mouse, a keyboard, etc.), and one or more output devices 206 (e.g., a display device, a printer, etc.). The computer system 200 may also include one or more storage devices 208. By way of example, the storage device(s) 208 can include devices such as disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 212, a communications system 214 (e.g., a modem, a network card (wireless or wired), an infra-red communication device, etc.), and working memory 218, which may include RAM and ROM devices as described above. In some embodiments, the computer system 200 may also include a processing acceleration unit 216, which can include a digital signal processor DSP, a special-purpose processor, and/or the like.

The computer-readable storage media reader 212 can further be connected to a computer-readable storage medium 210, together (and, optionally, in combination with storage device(s) 208) comprehensively representing remote, local, fixed, and/or removable storage devices plus storage media for temporarily and/or more permanently containing computer-readable information. The communications system 214 may permit data to be exchanged with the network and/or any other computer described above with respect to the system 200.

The computer system 200 may also comprise software elements, shown as being currently located within a working memory 218, including an operating system 220 and/or other code 222, such as an application program (which may be a client application, Web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

Software stored on and/or executed by system 200 can include instructions for initiating communications between entities operating in disparate environments and/or with different base protocols. For example, software executed by a web server or other application server and a client computer or other device can be used to initiate communications between two or more client computers or other devices. As introduced above, initiating a communication between a first entity, i.e., client device or computer, and a second entity, i.e., client device or computer, can comprise receiving a request at an application server from the first entity to initiate communications with the second entity. An initiation message can be generated by the application server and formatted in a base protocol of the second entity. The initiation message can be sent by the application server to the second entity to initiate communications between the first entity and the second entity in the base protocol of the second entity.

Figure 3:
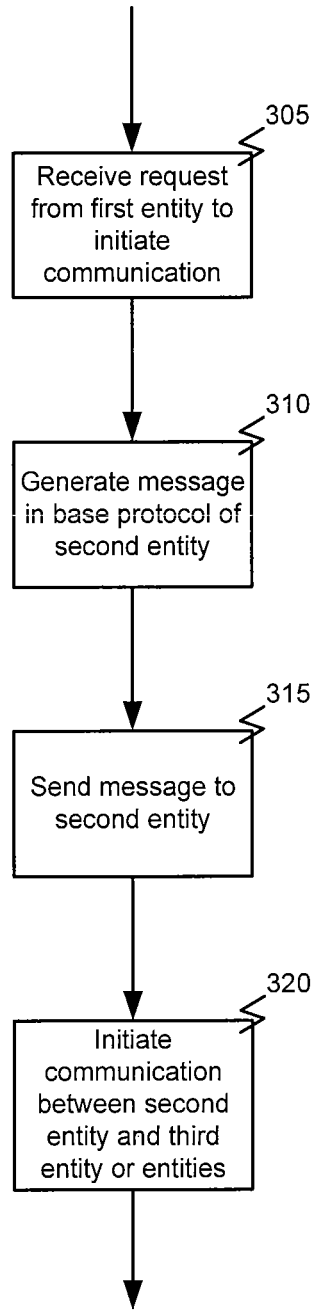
FIG. 3 is a flowchart illustrating a process for initiating communications according to one embodiment of the present invention.

FIG. 3 is a flowchart illustrating a process for initiating communications according to one embodiment of the present invention. In this example, processing begins with receiving 305 a request from the first entity to initiate communications. According to one embodiment the request can identify the parties to the communication, i.e., the "caller" and the "callee" or the sender of the request and the intended recipient. For example, an address, number, or other indication of the parties.

A message can be generated 310 and formatted in a base protocol of the second entity. As noted above, the base protocol of the second entity can be different from a base protocol of the first entity. For example, the base protocol of the first entity can comprise Session Initiation Protocol (SIP) and the base protocol of the second entity can comprise Hypertext Transfer Protocol (HTTP). Alternatively, the base protocol of the first entity can comprise HTTP and the base protocol of the second entity can comprise SIP.

The message can be sent 315 to the second entity and communications can be initiated 320 between a third entity or entities and the second entity in the base protocol of the second entity, assuming that the second entity is available and responds to the message. That is, based on the initial message from the first entity, the parties identified in the request can be connected for communication in the base protocol of the second entity. o the second entity to cause the second entity to perform an action such as to initiate communications with a third entity in the base protocol of the second entity. According to one embodiment, the second entity and the third entity can be embodied on the same physical device. That is, an entity, as referred to herein can represent a logical division based on functions preformed and/or protocols employed but does not necessarily relate to a physical division of devices or components.

Figure 4:
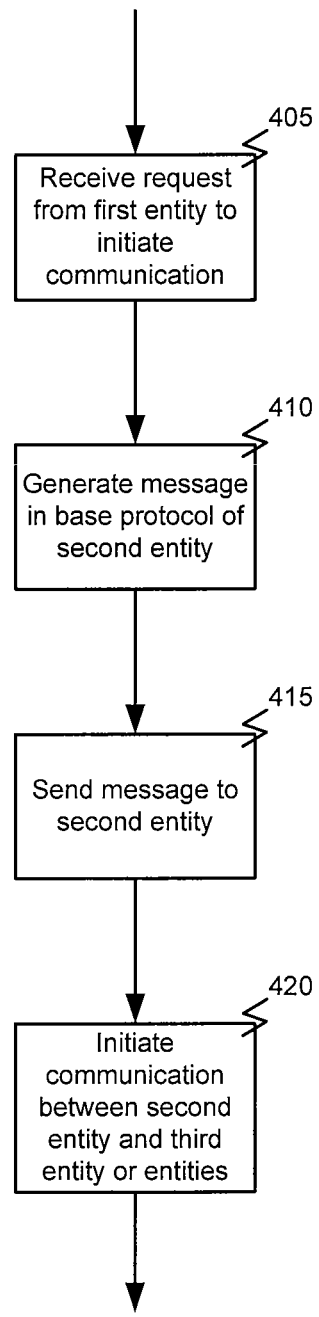
FIG. 4 is a flowchart illustrating a process for initiation communications according to another embodiment of the present invention.

FIG. 4 is a flowchart illustrating a process for initiating communications according to another embodiment of the present invention. In this example, processing begins with receiving 405 a request from the first entity to initiate communications. According to one embodiment the request can identify the parties to the communication, i.e., the "caller" and the "callee" or the sender of the request and the intended recipient. For example, an address, number, or other indication of the parties.

A message can be generated 410 and formatted in a base protocol of the second entity. As noted above, the base protocol of the second entity can be different from a base protocol of the first entity. For example, the base protocol of the first entity can comprise Session Initiation Protocol (SIP) and the base protocol of the second entity can comprise Hypertext Transfer Protocol (HTTP). Alternatively, the base protocol of the first entity can comprise HTTP and the base protocol of the second entity can comprise SIP.

The message can be sent 415 to the third entity and communications can be initiated 420 between a third entity or entities and the first entity in the base protocol of the second entity, assuming that the second entity is available and responds to the message. That is, based on the initial message from the first entity, the parties identified in the request can be connected for communication in the base protocol of the second entity.

Figure 5:
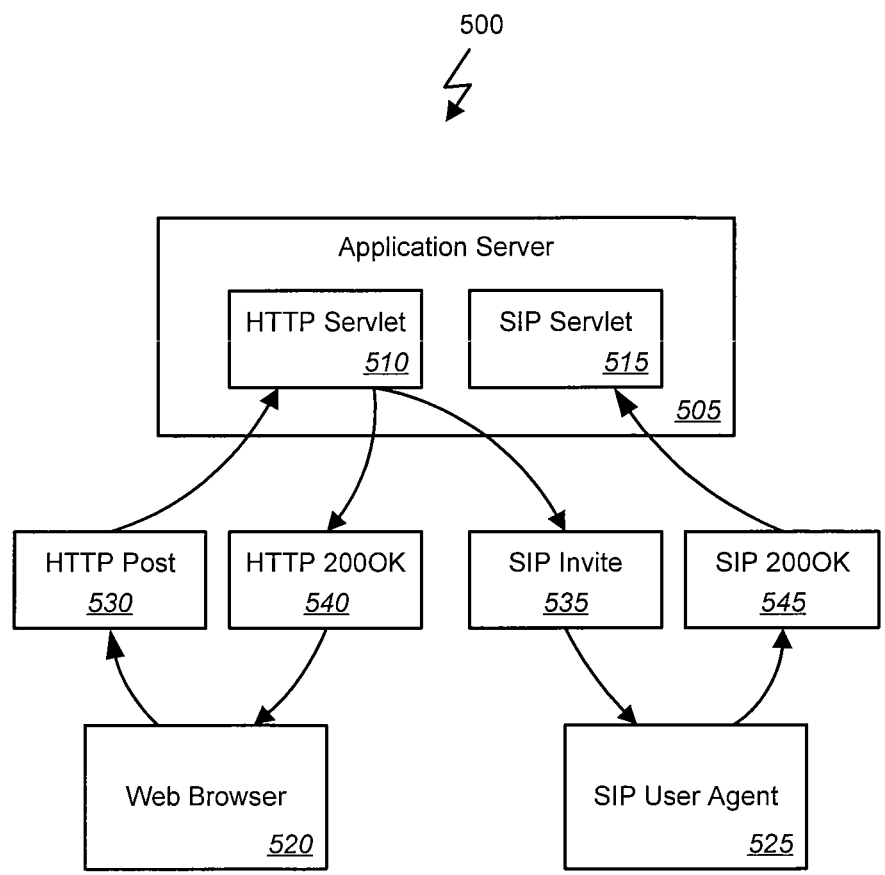
FIG. 5 is a block diagram illustrating an exemplary flow of messages between entities in a self invitation process according to one embodiment of the present invention.

FIG. 5 is a block diagram illustrating an exemplary flow of messages between entities in a self invitation process according to one embodiment of the present invention. More specifically, this example illustrates a process that may be used to provide a "Click-to-Dial" application in which a user of a web based application can initiate a call to a mobile device. In this example a web browser 520 can send a request in the form of an HTTP POST request 530 to the application server 505. As noted above, the POST request 530 can include information identifying the parties to the communication, i.e., the "caller" and the "callee" or the sender of the request and the intended recipient. For example, the POST data may contain a SIP address for each of the parties.

Upon receipt of the HTTP POST request 530, the application server 505 can initiate an HTTP session or servlet 510. The HTTP servlet 510 may provide a method such as "doPost( )" that can be invoked. The method can provide code to create an SIP INVITE request. That is, the method can get an instance of SipFactory from a ServletContext object and create an application session object. Then, it creates the INVITE SIP request and sets a proper Sip Handler to handle the rest of the SIP logic. The method can create an HTTP Session object or servlet 515 in which it can, according to one embodiment, save some client data. The method of the HTTP servlet 510 can then send the SIP Invite message 535 to the SIP User Agent 525 which in turn, assuming it is available, can return a SIP acknowledgment 545 to the SIP servlet 515. The HTTP servlet 510 can also send an HTTP acknowledgment response 540 to the web browser 520.

It should be understood that FIG. 5 represents a logical division of functionality and is not intended to suggest any required division of components. Rather, the various functions may be implemented by any of a number or combination of components. For example, the SIP user agent 425 may be implemented as part of a client that also implements the web browser 420. In another example, the SIP user agent 425 may be implemented as part of the application server 405. Other combinations and implementations are also contemplated and considered to be within the scope of the present invention.

Figure 6:
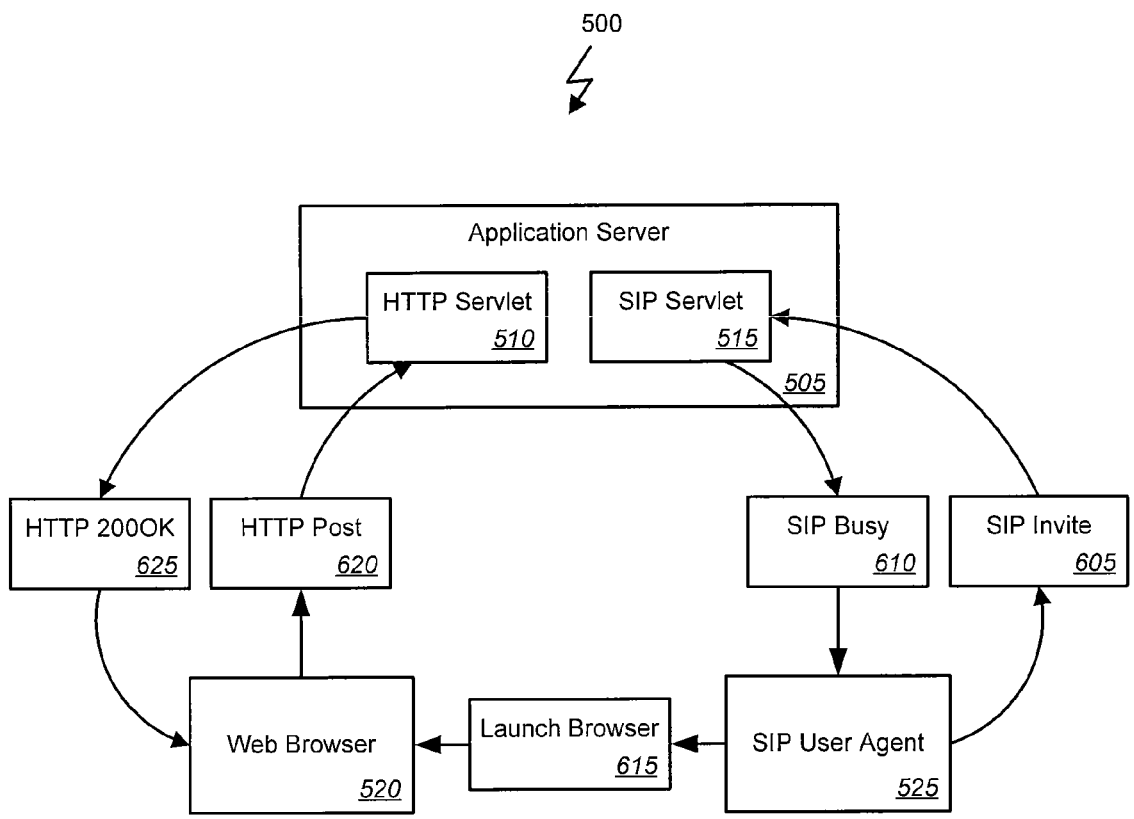
FIG. 6 is a block diagram illustrating an exemplary flow of messages between entities in a self invitation process according to one embodiment of the present invention.

FIG. 6 is a block diagram illustrating an exemplary flow of messages between entities in a self invitation process according to one embodiment of the present invention. More specifically, this example illustrates a process that may be used to provide a "Call Me Back" application in which a user of a mobile device can send a message to an email reader or web browser. In this example, a SIP user agent 525 tries to call a person by sending a SIP Invite 605 identifying the callee. The SIP Invite message can be processed by a SIP servlet 515.

An HTTP web page link can be created. If the application wants to come back to the same JVM since there may be some session data already saved, it could call an API that adds the host and port to the URL and appends an encoded JSessionID parameter to the URL. Assuming the callee is busy, the SIP servlet 515 sends back a SIP Busy message 610 to the SIP useragent 525 and a web page to ask the caller to fill in so that the callee could call back later. If agreed to between the SIP client 525 and SIP server 515, the URL can be saved as a special header.

The user agent 525 then retrieves the URL from the header and launches an HTTP browser 520. The HTTP browser 520 then sends a HTTP POST request 620 to an HTTP servlet 510 that can in turn service the request and send the "CallMeBack" web page to the user in an HTTP response 625.

According to one embodiment, it is also possible to have another case where the SIP servlet sends an HTTP invite to the application server that results in initiating an HTTP servlet that can get the data about the session and be able to push a page to the web client or react to a request from the web client. Similarly, on the client side, the client may behave so that when the SIP request fails, it sends an HTTP request to itself that results in the client going back to the HTTP servlet (that's has been created as described above.

Again, it should be understood that FIG. 6 represents a logical division of functionality and is not intended to suggest any required division of components. Rather, the various functions may be implemented by any of a number or combination of components. For example, the SIP user agent 425 may be implemented as part of a client that also implements the web browser 420. In another example, the SIP user agent 425 may be implemented as part of the application server 405. Other combinations and implementations are also contemplated and considered to be within the scope of the present invention.

Figure 7:
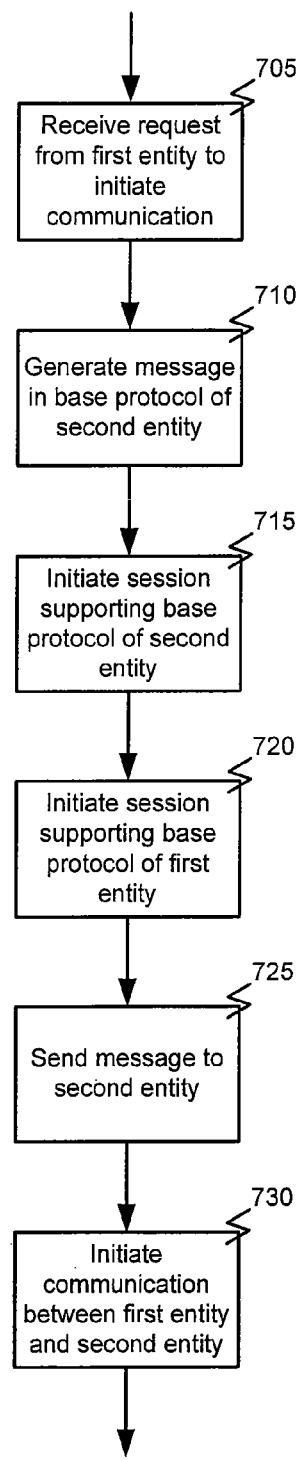
FIG. 7 is a flowchart illustrating additional details of a process for self invitation according to one embodiment of the present invention.

FIG. 7 is a flowchart illustrating additional details of a process for self invitation according to one embodiment of the present invention. In this example, processing begins with receiving 705 a request from the first entity to initiate communications. An initiation message can be generated 710 and formatted in a base protocol of the second entity. The base protocol of the second entity can be different from a base protocol of the first entity. For example, the base protocol of the first entity can comprise Session Initiation Protocol (SIP) and the base protocol of the second entity can comprise Hypertext Transfer Protocol (HTTP). Alternatively, the base protocol of the first entity can comprise HTTP and the base protocol of the second entity can comprise SIP. The initiation message can be sent to the second entity to cause the second entity to initiate communications with a third entity or entities in the base protocol of the second entity.

A session supporting the base protocol of the second entity can be initiated 715. Initiating the session supporting the base protocol of the second entity can be performed in response to the initiation message. A session supporting the base protocol of the first entity can also be initiated 720. Initiating the session supporting the base protocol of the first entity can be performed in response to receiving a request from the first entity to initiate communications with the second entity. State information can be shared between the session supporting the base protocol of the first entity and the session supporting the base protocol of the second entity. Sharing state information between the session supporting the base protocol of the first entity and the session supporting the base protocol of the second entity can be based on replication of one or more of the session supporting the base protocol of the first entity and the session supporting the base protocol of the second entity, on a Spring Framework, on a shared data store, or in another manner.

The initiation message can be sent 725 to the second entity and communications can be initiated 730 between the first entity and the second entity in the base protocol of the second entity, assuming that the second entity is available and responds to the message. That is, based on the initial message from the first entity, the parties identified in the request can be connected for communication in the base protocol of the second entity.

In the foregoing description, for the purposes of illustration, methods were described in a particular order. It should be appreciated that in alternate embodiments, the methods may be performed in a different order than that described. Additionally, the methods may contain additional or fewer steps than described above. It should also be appreciated that the methods described above may be performed by hardware components or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for initiating a communication session between client devices, the method comprising:
   receiving at an application server a request from a first client device to initiate the communication session, the request in a base protocol of an environment of the first client device;
   initiating a first servlet on the application server, the first servlet supporting a session with the first client device in the base protocol of the environment of the first client device;
   initiating a second servlet on the application server, the second servlet supporting a base protocol of an environment of a second client device, wherein the environment and base protocol of the second client device is different from the environment and base protocol of the first client device;

generating with the application server in the first servlet a message to initiate the communication session formatted in a base protocol of an environment of a second client device;

sending the message from the first servlet on the application server to the second client device to perform an action; and receiving at the second servlet on the application server a response based on the second client device performing the action.

2. The method of claim 1, wherein the action comprises initiating a communications between the second client device and a third client device in the base protocol of the second client device.

3. The method of claim 1, further comprising sending the message from the application server to a third client device to cause the third client device to perform an action.

4. The method of claim 3, wherein the action comprises initiating a communications with the second client device in the base protocol of the second client device.

5. The method of claim 2, further comprising initiating with the third client device a session supporting the base protocol of the first client device.

6. The method of claim 5, wherein initiating the session supporting the base protocol of the first client device is performed in response to receiving a request from the first client device to communicate with the second client device.

7. The method of claim 5, further comprising sharing state information between the session supporting the base protocol of the first client device and the session supporting the base protocol of the second client device.

8. The method of claim 7, wherein sharing state information between the session supporting the base protocol of the first client device and the session supporting the base protocol of the second client device is based on replication of one or more of the sessions supporting the base protocol of the first client device and the session supporting the base protocol of the second client device.

9. The method of claim 7, wherein sharing state information between the session supporting the base protocol of the first client device and the session supporting the base protocol of the second client device is based on a Spring Framework.

10. The method of claim 7, wherein sharing state information between the session supporting the base protocol of the first client device and the session supporting the base protocol of the second client device is based on a shared data store.

11. The method of claim 5, further comprising sharing context information between the session supporting the base protocol of the first client device and the session supporting the base protocol of the second client device.

12. The method of claim 1, wherein the base protocol of the first client device comprises Session Initiation Protocol (SIP) and the base protocol of the second client device comprises Hypertext Transfer Protocol (HTTP).

13. The method of claim 1, wherein the base protocol of the first client device comprises HTTP and the base protocol of the second client device comprises SIP.

14. A system comprising:

a communications network;

a first client device communicatively coupled with the communications network and operating in a first environment;

a second client device communicatively coupled with the communications network and operating in a second environment, wherein the second environment is different from the first environment; and an application server communicatively coupled with the communications network and adapted to receive a request to initiate a communication from the first client device in a base protocol of the first environment, initiate a first servlet supporting a session with the first client device in the base protocol of the environment of the first client device, initiate a second servlet supporting a base protocol of the second environment, generate a message in the first servlet, the message to initiate the communication and formatted in the base protocol of the second environment send the message from the first servlet on the application server to the second client device to perform an action, and receive at the second servlet on the application server a response based on the second client device performing the action.

15. The system of claim 14, wherein the action comprises initiating communications between the second client device and a third client device in the base protocol of the second client device.

16. The system of claim 14, wherein the application server is further adapted to send the message to the second client device to cause the second client device to perform an action.

17. The system of claim 16, wherein the action comprises initiating communications with the applications server in the base protocol of the second client device.

18. The system of claim 14, wherein initiating the servlet session supporting the base protocol of the second client device is performed in response to the request from the first client device.

19. The system of claim 18, wherein initiating the servlet session supporting the base protocol of the first client device is performed in response to receiving a request from the first client device to initiate communications with the second client device.

20. The system of claim 19, wherein the servlet session supporting the base protocol of the first client device and the servlet session supporting the base protocol of the second client device are adapted to share state information.

21. The system of claim 20, wherein the servlet session supporting the base protocol of the first client device and the servlet session supporting the base protocol of the second client device are adapted to share state information based on replication of one or more of the servlet sessions supporting the base protocol of the first client device and the servlet session supporting the base protocol of the second client device.

22. The system of claim 20, wherein the servlet session supporting the base protocol of the first client device and the servlet session supporting the base protocol of the second client device are adapted to share state information based on a Spring Framework.

23. The system of claim 20, wherein the servlet session supporting the base protocol of the first client device and the servlet session supporting the base protocol of the second client device are adapted to share state information based on a shared data store.

24. The system of claim 20, wherein the servlet session supporting the base protocol of the first client device and the servlet session supporting the base protocol of the second client device are adapted to share context information.

25. The system of claim 14, wherein the base protocol of the first client device comprises Session Initiation Protocol (SIP) and the base protocol of the second client device comprises Hypertext Transfer Protocol (HTTP).

26. The system of claim 14, wherein the base protocol of the first client device comprises HTTP and the base protocol of the second client device comprises SIP.

27. A machine-readable memory having stored thereon a series of instructions which, when executed by a processor, cause the processor to initiate communications by:
  receiving at an application server a request from a first client device to initiate the communication, the request in a base protocol of an environment of the first client device;
  initiating a first servlet on the application server, the first servlet supporting a session with the first client device in the base protocol of the environment of the first client device;
  initiating a second servlet on the application server, the second servlet supporting a base protocol of an environment of a second client device, wherein the environment and base protocol of the second client device is different from the environment and base protocol of the first client device;
  generating with the application server in the first client device first servlet a message to initiate the communication session formatted in a base protocol of an environment of a second client device;
  sending the message from the first servlet on the application server to the second client device to perform an action; and
  receiving at the second servlet on the application server a response based on the second client device performing the action.

28. The machine-readable memory of claim 27, wherein the action comprises initiating a communication between the second client device and a third client device in the base protocol of the second client device.

29. The machine-readable memory of claim 27, further comprising sending the message to a third client device to cause the third client device to perform an action.

30. The machine-readable memory of claim 29, wherein the action comprises initiating a communication with the second client device in the base protocol of the second client device.

31. The machine-readable memory of claim 27, wherein initiating the session supporting the base protocol of the second client device is performed by the third client device in response to the message.

32. The machine-readable memory of claim 27, further comprising initiating with the third client device a session supporting the base protocol of the first client device.

33. The machine-readable memory of claim 32, wherein initiating the session supporting the base protocol of the first client device is performed in response to receiving a request from the first client device to communicate with the second client device.

34. The machine-readable memory of claim 32, further comprising sharing state information between the session supporting the base protocol of the first client device and the session supporting the base protocol of the second client device.

35. The machine-readable memory of claim 34, wherein sharing state information between the session supporting the base protocol of the first client device and the session supporting the base protocol of the second client device is based on replication of one or more of the sessions supporting the base protocol of the first client device and the session supporting the base protocol of the second client device.

36. The machine-readable memory of claim 34, wherein sharing state information between the session supporting the base protocol of the first client device and the session supporting the base protocol of the second client device is based on a Spring Framework.

37. The machine-readable memory of claim 34, wherein sharing state information between the session supporting the base protocol of the first client device and the session supporting the base protocol of the second client device is based on a shared data store.

38. The machine-readable memory of claim 34, further comprising sharing context information between the session supporting the base protocol of the first client device and the session supporting the base protocol of the second client device.

39. The machine-readable memory of claim 27, wherein the base protocol of the first client device comprises Session Initiation Protocol (SIP) and the base protocol of the second client device comprises Hypertext Transfer Protocol (HTTP).

40. The machine-readable memory of claim 27, wherein the base protocol of the first client device comprises HTTP and the base protocol of the second client device comprises SIP.

41. The method of claim 1, wherein generating with the application server in the first servlet the message to initiate the communication session formatted in the base protocol of the environment of the second client device comprises:
  instantiating an instance of an object of the second servlet on the first servlet; and
  invoking a method of the instance of the object on the first servlet.

42. The system of claim 14, wherein generating with the application server in the first servlet the message to initiate the communication session formatted in the base protocol of the environment of the second client device comprises:
  instantiating an instance of an object of the second servlet on the first servlet; and
  invoking a method of the instance of the object on the first servlet.

43. The machine-readable memory of claim 27, wherein generating with the application server in the first servlet the message to initiate the communication session formatted in the base protocol of the environment of the second client device comprises:
  instantiating an instance of an object of the second servlet on the first servlet; and
  invoking a method of the instance of the object on the first servlet.

* * * * *

UNITED STATES PATENT AND TRADEMARK OFFICE
CERTIFICATE OF CORRECTION

PATENT NO.        : 8,775,641 B2
APPLICATION NO.   : 11/669327
DATED             : July 8, 2014
INVENTOR(S)       : Maes It is certified that error appears in the above-identified patent and that said Letters Patent is hereby corrected as shown below:

In the Specification

Column 7, line 66, delete "entity.o" and insert -- entity or --, therefor.

Column 9, line 21, delete "useragent" and insert -- user agent --, therefor.

In the Claims

Column 13, lines 19-20, in Claim 27, delete "first client device first" and insert -- first --, therefor.

Signed and Sealed this
Twenty-fourth Day of February, 2015

Michelle K. Lee
*Deputy Director of the United States Patent and Trademark Office*